J. R. SCHADOW.
AUTOMATIC FEED MECHANISM FOR PUNCHES.
APPLICATION FILED MAR. 20, 1917.
1,257,938.
Patented Feb. 26, 1918.
6 SHEETS—SHEET 4.
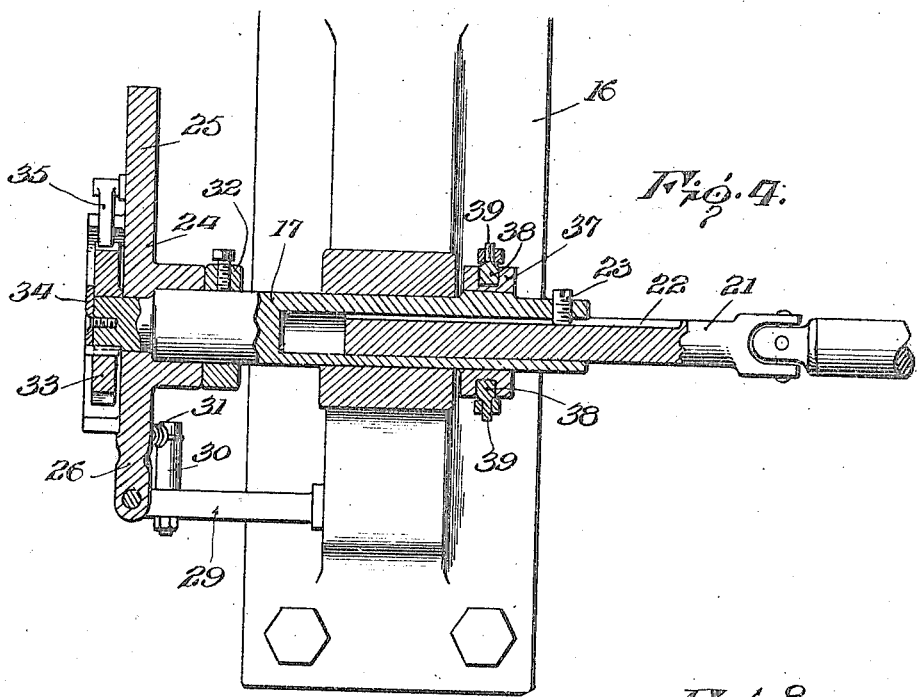
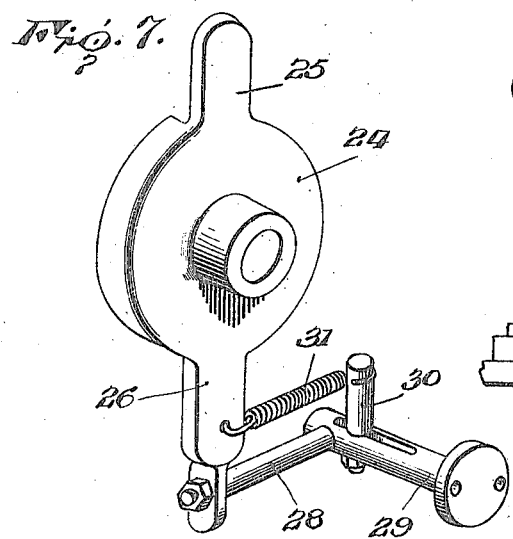
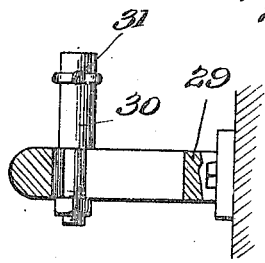
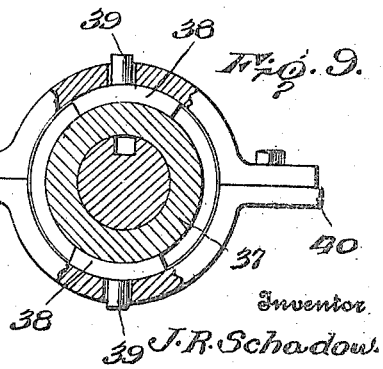
Inventor
J. R. Schadow.
By
Attorneys.

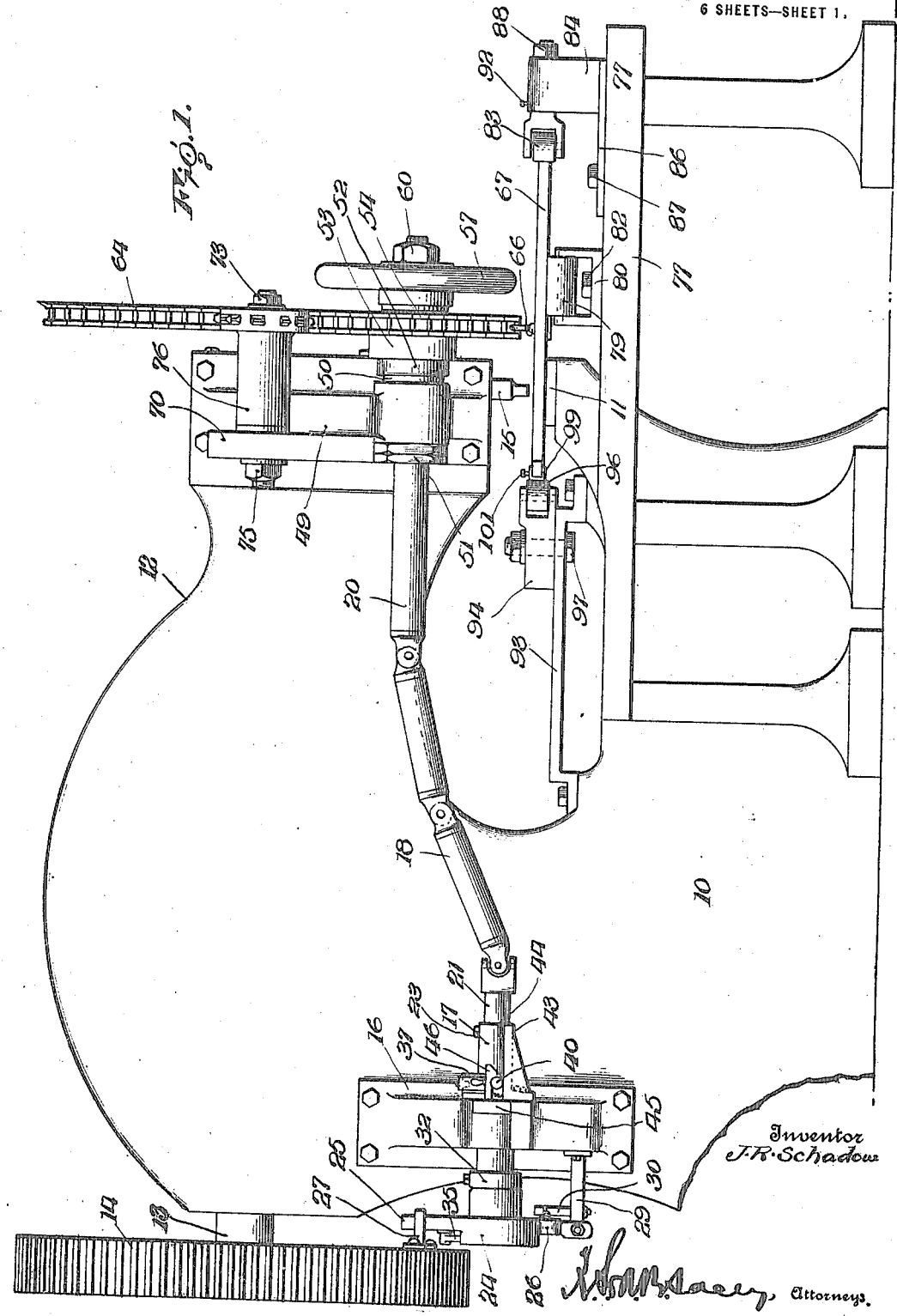

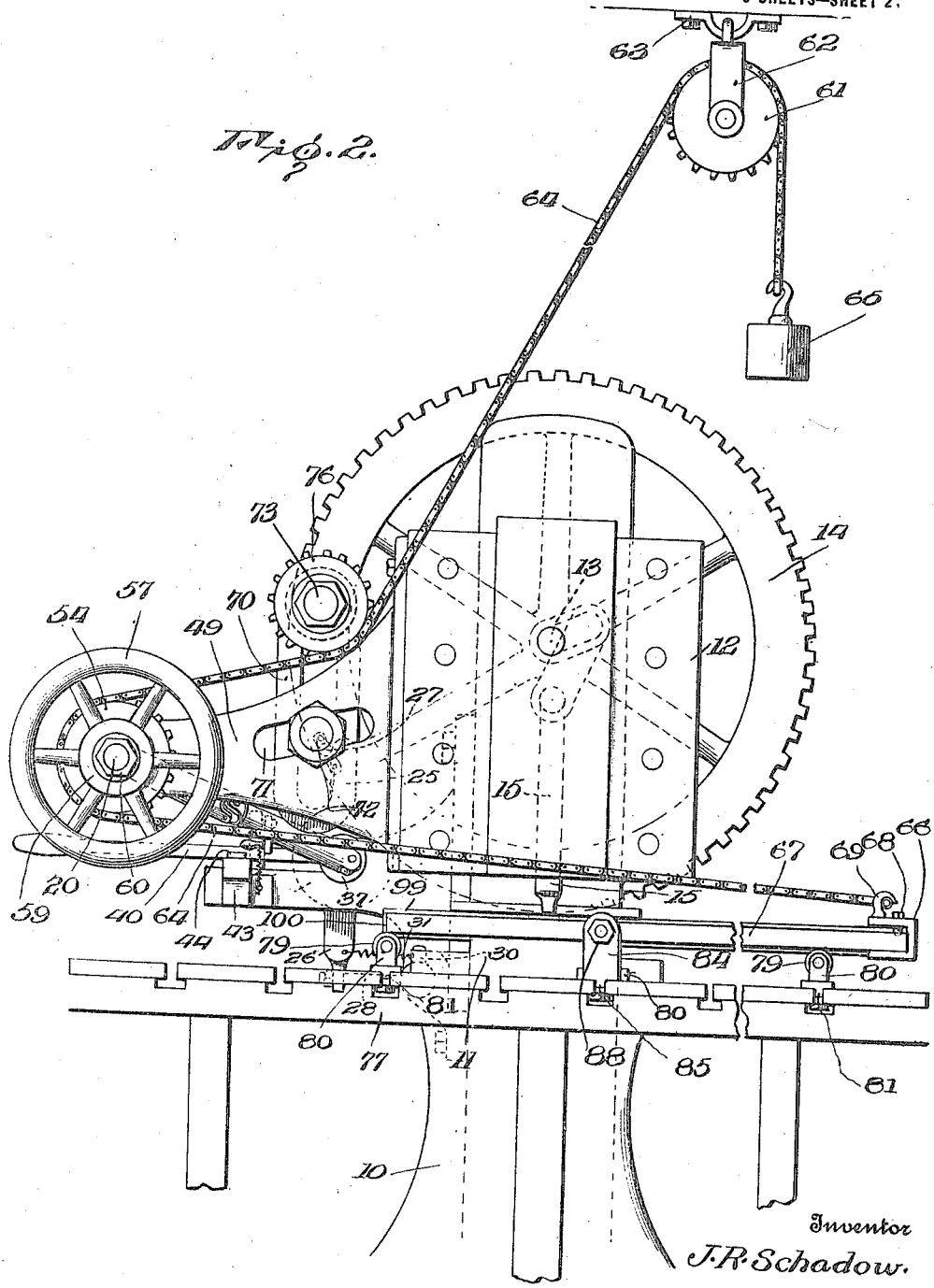

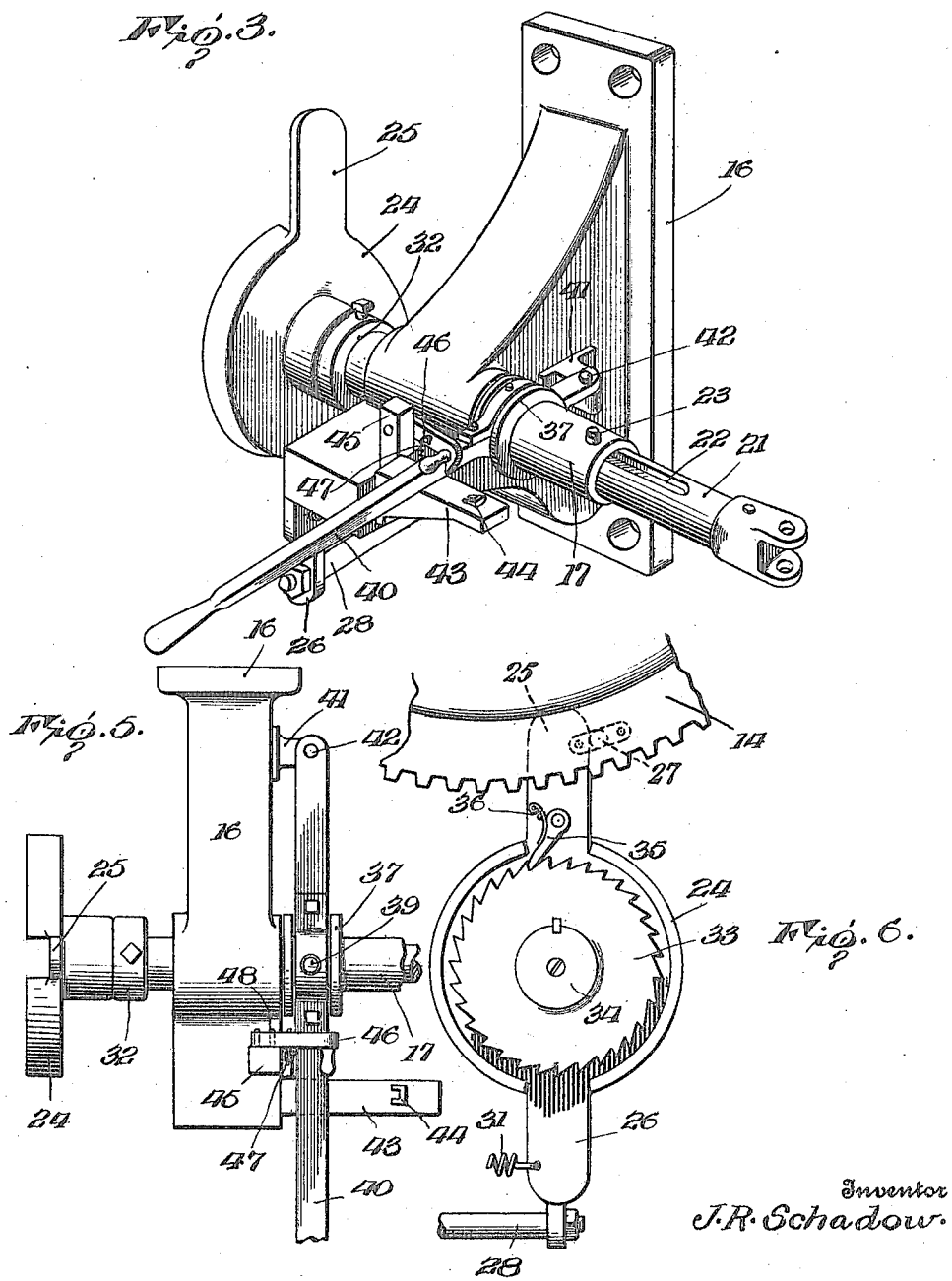

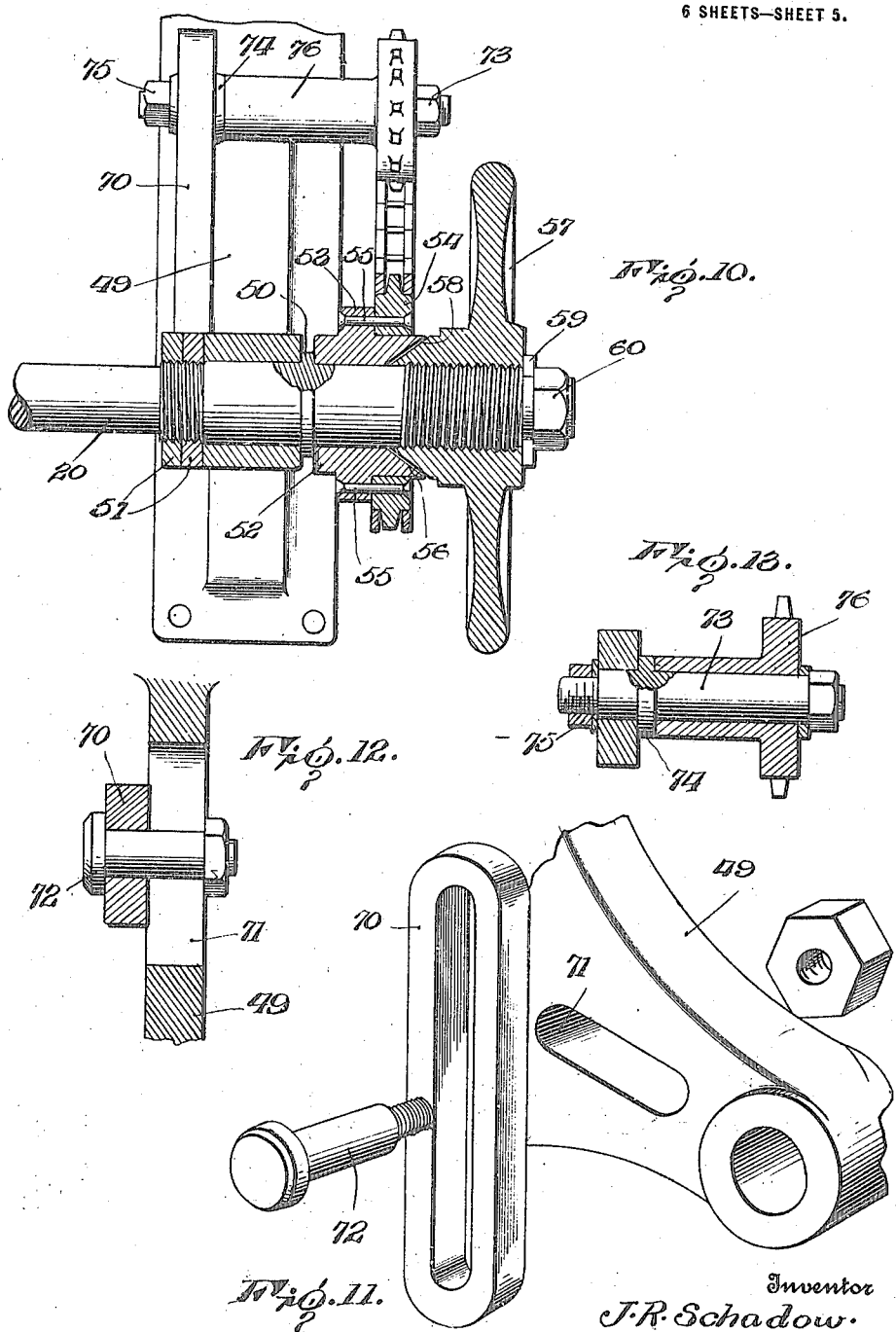

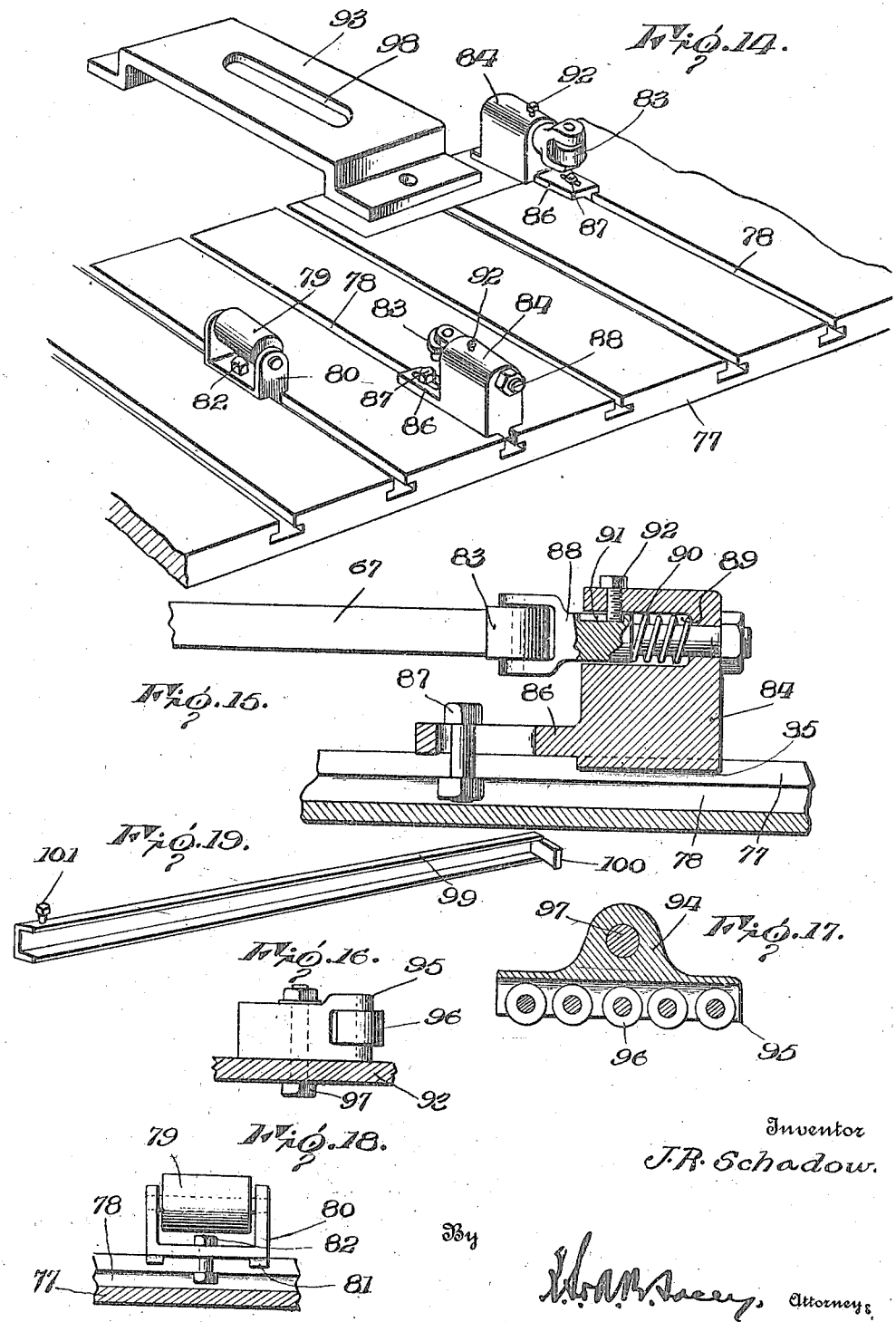

UNITED STATES PATENT OFFICE.

JULIUS R. SCHADOW, OF VALLEJO, CALIFORNIA.

AUTOMATIC FEED MECHANISM FOR PUNCHES.

1,257,938. Specification of Letters Patent. Patented Feb. 26, 1918.

Application filed March 20, 1917. Serial No. 156,124.

*To all whom it may concern:*

Be it known that I, JULIUS R. SCHADOW, a citizen of the United States, residing at Vallejo, in the county of Solano and State of California, have invented certain new and useful Improvements in Automatic Feed Mechanism for Punches, of which the following is a specification.

This invention relates to an improved feeding mechanism for sheet metal punches and has as its primary object to provide an arrangement wherein a sheet of metal may be automatically fed to the punch as the punch is operated.

The invention has as a further object to provide an improved mechanism operated by a step by step movement for advancing the sheet of metal as the punch is operated and wherein the sheet of metal will be advanced a uniform distance each time the sheet is shifted beneath the punch to insure the accurate punching of the said sheet.

The invention has as a further object to provide an arrangement employing a pawl and ratchet mechanism for operating the drive shaft employed and wherein the said pawl and ratchet mechanism may be manually shifted and locked in active position so that the feed mechanism will be actuated as the punch is operated and may also be manually shifted and locked in inactive position to render the feed mechanism inoperative.

The invention has as a still further object to provide an arrangement wherein the length of the step of the feed mechanism may be easily varied for accordingly varying the feed of the sheet of metal.

And the invention has as a still further object to provide an improved arrangement of supporting table and guide rollers for the metal sheet to be fed to the punch with the said rollers arranged to hold the sheet firmly in position.

Other and incidental objects will appear as the description proceeds and in the drawings wherein I have illustrated the preferred embodiment of the invention and wherein similar reference characters designate corresponding parts throughout the several views:

Figure 1 is a side elevation showing my improved feed mechanism in connection with a conventional type of punch, Fig. 2 is an end elevation particularly showing the arrangement of sprocket chain employed for feeding a sheet of metal to the punch, Fig. 3 is a fragmentary perspective view showing the bracket employed for supporting the inner end of the drive shaft of the mechanism and the shift lever associated with the adjacent terminal of the said shaft, Fig. 4 is a fragmentary sectional view illustrating the slidable connection between the sections of the drive shaft at the inner extremity thereof as well as the pawl and ratchet mechanism mounted upon the adjacent terminal of the said shaft, Fig. 5 is a fragmentary plan view particularly illustrating the disposition of the shift lever for the pawl and ratchet mechanism, Fig. 6 is a fragmentary front elevation of the said pawl and ratchet mechanism, Fig. 7 is a fragmentary perspective view illustrating the ratchet drum employed and the stop bracket for limiting the drum in its movement under the influence of the spring arranged to retract the drum, Fig. 8 is a detail sectional view illustrating the adjustable mounting of the pin upon the stop bracket for receiving the said spring, Fig. 9 is a fragmentary sectional view illustrating the mounting of the shipper ring upon the inner terminal section of the drive shaft and the engagement of the shift lever with the said ring, Fig. 10 is a fragmentary sectional view showing the detachable mounting of the drive sprocket ring employed in connection with the feed mechanism as well as the clutch for rendering the said mechanism inactive, Fig. 11 is a fragmentary perspective view showing the outer extremity of the bracket for supporting the outer terminal of the drive shaft as well as the slotted bar which is connected to the said bracket for supporting the idler sprocket employed, Fig. 12 is a fragmentary sectional view showing the adjustable connection between the idler sprocket supporting bar and the supporting bracket for the said bar, Fig. 13 is a similar view particularly showing the mounting of the idler sprocket upon the supporting bar therefor, Fig. 14 is a fragmentary perspective view illustrating a portion of the feed table employed and the arrangement of the guide and rest rollers thereon, Fig. 15 is a sectional view showing in detail one of the yieldably mounted lateral guide rollers, Fig. 16 is a view of the guide member employed opposite the punch, this guide member being provided with fixed rollers and being adjustably mounted upon the bar shown in Fig. 14, Fig. 17 is a sectional view of the guide member of Fig. 16 and illustrating the mounting of the rollers thereon, Fig. 18 is a detail view of one of the rest rollers, and Fig. 19 is a detail perspective view showing an edging strip preferably employed in connection with my improved mechanism.

In order that the construction, mounting and operation of my improved punch feeding mechanism may be accurately understood, I have, in the drawings, illustrated the said mechanism in connection with a conventional type of sheet metal punch including a body 10 provided with an anvil 11 and formed with an extension 12 overhanging the anvil. Arranged to extend longitudinally through the extension is the main drive shaft 13 of the punch upon one end of which is fixed a main drive gear 14. Suitably connected with the inner extremity of the said shaft is a punch 15 mounted to reciprocate vertically within the inner extremity of the extension 12 to coöperate with the anvil 11.

Coming now more particularly to the subject of the present invention, I employ a bracket 16 bolted or otherwise secured to the body 10 of the punch at the extremity thereof adjacent the gear wheel 14. This bracket extends laterally from the punch body and rotatably mounted thereon is the inner terminal section 17 of the flexible drive shaft 18 of my improved mechanism. The outer terminal section of the said shaft is indicated at 20. The section 17 of the shaft is slidable longitudinally upon the bracket 16 and is, as particularly shown in Fig. 4 of the drawings, cored out to slidably receive the adjacent extremity of the coacting section 21 of the said shaft. Formed in the section 21 upon one side thereof is a longitudinally extending groove 22 in which is engaged a pin 23 threaded through the terminal section 17 of the shaft. The section 17 is thus slidable longitudinally upon the section 21 while being connected to the latter section for rotating the shaft.

Rotatably mounted upon the free extremity of the shaft section 17 is a ratchet drum or housing 24 having diametric radial arms 25 and 26 extending therefrom. This housing is seen in detail in Fig. 7 of the drawings. The arm 25 normally projects upwardly from the shaft section 17 adjacent the inner side of the gear wheel 14 and is arranged in the path of rotary movement of a post or detent 27 suitably connected to the said gear wheel, as particularly shown in Fig. 1, adjacent the periphery thereof. The outer extremity of the arm 26 is given a half turn and secured to the said arm is a pin 28. This pin is arranged for engagement with a post 29 projecting laterally from the outer side of the bracket 16. The post 29 is, as particularly shown in Fig. 8, slotted longitudinally to adjustably receive an upstanding spring receiving pin 30 and extending between the said pin and the outer extremity of the arm 26 of the ratchet drum is a suitable spring 31. This spring normally acts to rotate the ratchet drum upon the shaft section 17 to a position with the arm 25 of the said drum projected into the path of the post 27 upon the gear wheel 14 with the pin 28 engaging with the post 29 for limiting the said ratchet drum in its movement under the influence of the said spring. The pin 30 is adjustable longitudinally upon the post 29 so that the pin may be properly positioned with respect to the ratchet drum.

The ratchet drum 24 is held against inward movement upon the shaft section 17 by a collar 32 and received within the said drum, is, as particularly shown in Figs. 4 and 6, a ratchet 33. This ratchet is keyed or otherwise secured to the adjacent terminal of the shaft section 17 and is held against outward displacement therefrom by a plate 34 connected with the said shaft section by screws or other suitable fastening devices. Pivotally mounted upon the adjacent side of the arm 25 of the ratchet drum is a pawl 35 engaged by a spring 36 normally urging the pawl to coöperate with the ratchet 33. As will now be readily understood, the post 27 upon the gear wheel 14 of the punch will, as the said gear wheel is rotated, strike the arm 25 of the ratchet drum 24 to rock the said drum upon the shaft section 17 and shift the pawl 35 to actuate the ratchet 33 for rotating the shaft 18 by a step by step movement, the spring 31 acting to return the ratchet drum to normal position upon the release thereof by the said post.

Keyed or otherwise secured to the shaft section 17 upon the inner side of the bracket 16 is a channeled shipper ring 37. Mounted to loosely engage in the channel of this ring, as shown in detail in Fig. 9, are opposed shoes 38 provided upon the outer sides thereof with radially extending pins 39. Pivotally engaging with the said pins are the mating sections of a shift or control lever 40 extending around the shipper ring. The sections of the lever 40 may, as shown in detail in Fig. 9, be secured together in any suitable manner by bolts or other approved fastening devices. The lever 40 is, as particularly shown in Figs. 3 and 5 of the drawings, supported, at its inner extremity, by a bracket 41 suitably secured to the inner side of the bracket 16, adjacent its inner extremity, and provided at its outer end, with an upstanding pin 42 pivotally receiving the inner end of the said lever with the lever projecting outwardly beyond the outer terminal of the bracket 16. Slidably supporting the outer extremity of the lever, is a bracket 43 suitably secured to the inner side of the bracket 16 adjacent its outer extremity to project laterally therefrom. The bracket 43 is arranged to hold the lever 40 in substantially horizontal position and is provided, at its outer extremity, with an upstanding stop or lug 44. Upstanding from the bracket 16 adjacent the inner extremity of the bracket 43, is a post 45 upon which is pivoted a catch member 46. This catch member is arranged to engage over the lever 40 and extending between the said catch member and the base of the bracket 43 is a suitable spring 47 normally urging the catch member downwardly to active position. Arranged to limit the catch member in its downward movement is, as particularly shown in Fig. 5, a pin 48 projecting laterally from the post.

It will now be noted that the catch member 46 may be released and the lever 43 swung outwardly to slide the shaft section 17 upon the bracket 16 and telescopically upon the shaft section 21 for shifting the ratchet drum and pawl and ratchet mechanism associated therewith out of the path of the post 27 upon the gear 14, to inactive position. For holding the ratchet drum in such position, the lever 40 may be engaged over the stop 44 upon the bracket 43. Inward movement of the lever will, of course, shift the shaft section 17 in the opposite direction upon the bracket 16 to dispose the ratchet drum in the path of the post 27, with the catch member 46 operable to automatically engage over the said lever for locking the ratchet drum and the pawl and ratchet mechanism associated therewith in active position.

Suitably connected with the overhanging extension 20 of the punch to extend laterally therefrom is a bracket 49 which, at its outer extremity, rotatably receives the outer shaft section 20. This shaft section is, as particularly shown in Fig. 10 provided with a collar 50 abutting the outer side of the said bracket and is equipped with superposed jam nuts 51 screw threaded upon the said shaft section to confront the inner side of the bracket for connecting the said shaft section thereto. Loosely fitted on the outer extremity of the shaft section 20 is a clutch sleeve 52 abutting the collar 50 and provided, intermediate its length, with a radial flange 53. Removably fitted over the outer extremity of the said clutch sleeve to abut the said flange, is a drive sprocket ring 54 connected with the sleeve by a plurality of pins or other suitable fastening devices 55 projected through the flange 53 and detachably engaging at their inner extremities through the said ring. The clutch sleeve 52, at its outer end, is formed with a conical clutch face 56 and screw threaded upon the outer extremity of the shaft section 20, is a hand wheel 57, the hub of which is formed, at its inner extremity, with a conical terminal 58 to fit within the clutch face 56 of the clutch sleeve 52. The outer terminal of the shaft section 20 is reduced to receive a washer 59 engaged by a nut 60 screw threaded upon the reduced terminal of the shaft section to engage the said washer for connecting the hand wheel 57 with the said shaft section. The hand wheel 57 may therefore be adjusted to active position engaging by the conical inner terminal 58 of the hub thereof within the conical clutch face 56 of the sleeve 52 for binding the said sleeve between the hand wheel and the collar 50 and thus connecting the sleeve with the shaft section 20 to rotate therewith. Rotary movement of the shaft 18 will then be imparted to the drive sprocket ring 54. For rendering this drive mechanism inactive, it is simply necessary to adjust the hand wheel 57 to inactive position abutting the washer 59, when the sleeve 52 will be released so that the shaft section 20 may turn independently thereof.

Suspended from a suitable support above and in the rear of the drive sprocket ring 54 is an idler sprocket 61 carried by a hanger 62 detachably engaged with a suitable clip 63 connected with the said support. Trained over the said sprocket and around the sprocket ring 54, is a sprocket chain 64 to one end of which is detachably secured a suitable weighted element 65 while to the opposite end of the said chain is detachably connected a clamp 66. This clamp is, as particularly shown in Fig. 2, of substantially U-shape and is formed to engage around the rear end margin of a piece of sheet metal, conventionally illustrated at 67, with the forward extremity of the said sheet of metal resting upon the anvil 11 of the punch. Threaded through the uppermost arm of the clamp 66, is a set screw 68 adjustable upon the clamp to engage the sheet of metal 67 and upstanding from the said arm of the clamp, adjacent its outer extremity, is a hook 69 detachably receiving the adjacent terminal of the sprocket chain 64. This provides an arrangement whereby the chain may be disconnected from the clamp while the clamp may, in turn, be easily attached to or detached from the sheet of metal 67.

Connected to the inner side of the bracket 49 adjacent its inner extremity, is an upstanding slotted bar 70 seating flat against the said bracket and projected through the slot in the bar and through a longitudinally extending slot 71 in the bracket 49, is, as shown in detail in Fig. 12 of the drawings, a bolt 72 securing the bar upon the bracket. Mounted upon the bar 70, is a stub shaft 73 provided, adjacent its inner extremity, as shown in detail in Fig. 13, with a collar 74 abutting the bar with the inner terminal of the said shaft projecting through the slot in the bar and adjustably secured thereto by a nut 75. Rotatably mounted upon the said stub shaft is an idler sprocket 76. This sprocket is supported by the stud shaft 73 to engage over the sprocket chain 64 between the drive sprocket ring 54 and the idler sprocket 61. The idler sprocket 76 is adjustable longitudinally upon the bar 70 for depressing the sprocket chain to engage with the drive sprocket ring 54 while the bar is adjustable longitudinally upon the bracket 49 to position the said idler sprocket with respect to the drive sprocket ring. Consequently, the sprocket chain 64 may be maintained in effective engagement with the drive sprocket ring with the weight 65 acting to hold the free extremity of the sprocket chain taut. Thus, as the step by step movement is communicated to the shaft 28, in the manner previously described, the drive sprocket ring 54 will be correspondingly rotated to actuate the sprocket chain 64 and automatically advance the sheet of metal 67 by a step by step movement over the anvil 11 beneath the punch 15 as the punch is operated. In this connection it will, of course, be understood that the weight 65 is only heavy enough to take up the slack in the sprocket chain and will thus be incapable of effecting a movement of the sheet being punched.

In this connection, attention is directed to the fact that the drive sprocket ring may be removed from the sleeve 52 and another ring having a different diameter substituted therefor. In this way, the step movement to be imparted to the sprocket chain 64 and consequently to the sheet of metal 67 may be easily varied or, in other words, the length of the step of such movement may be thus lengthened or shortened. Consequently, compensation may be made according as to whether or not it is desired to punch holes in the sheet 67 relatively close together or wide apart. Moreover, by removing the ratchet 33 from the shaft section 17 and substituting another ratchet therefor having a different diameter the step movement to be imparted to the sprocket chain 64 may be further regulated.

Mounted to extend transversely of the body of the punch 10 beneath the anvil 11, is a work supporting table 77 cut away, as particularly seen in Fig. 14, to fit around the punch body, and provided with a plurality of transverse T-shaped slots 78. Mounted upon the table, at opposite sides of the anvil 11, are a plurality of rest rollers 79, arranged, as particularly shown in Figs. 1 and 2, to support the metal sheet 67 for movement over the anvil 11. Any suitable number of these rollers may be employed. Each of the rollers includes a substantially U-shaped body 80 between the upstanding arms of which the roller wheel is mounted. Extending downwardly from the body is, as shown in detail in Fig. 18, oppositely disposed lugs 81 adapted to slidably engage in one of the slots 78 of the table 77 and connecting the roller with the table is a bolt or other suitable fastening device 82 extending through the bight of the body 80 with the nut of the bolt slidably received within the said slot. As will be apparent, the bolts 82 of the rollers 79 may thus be manipulated for adjusting the said rollers transversely of the table to receive the metal sheet 67.

Arranged upon the table, adjacent opposite sides thereof, are yieldably mounted guide rollers 83 arranged for engagement with opposite longitudinal edges of the sheet 67 for directing the said sheet beneath the punch 15. Any suitable number of the rollers 83 may, as in the instance of the rest rollers 79, be employed and each include, as particularly shown in Fig. 15, a body 84 upon the inner terminal of which is formed a lug 85 for slidable engagement in one of the slots 78 of the table. Extending laterally from the body 84 is a flange or foot 86 slotted to adjustably receive a bolt or other suitable fastening device 87, the head of which is received within the said slot of the table for adjustably connecting the roller with the table. The roller 83 is supported by a plunger 88, the shank of which projects through a recess 89 in the body 84 and is slidably connected with the body. The shank of the plunger intermediate its ends is formed with a stop shoulder and bearing between the said shoulder and the inner end of the recess 89 is a helical spring 90 normally tending to urge the roller 83 outwardly upon the body 84 for yieldable engagement with the sheet 67. Upon its upper side, the shank of the plunger is provided with a longitudinally extending groove 91 and slidably engaging, at its inner extremity, in said groove, is a pin 92 screw threaded through the upper side of the body 84 with the said pin acting to guide the plunger in its movement upon the body 84 and hold the roller 83 with its peripheral face presented to the sheet 67 or, in other words, with the said roller disposed in a horizontal position. It will now be seen that the rollers 83 may be positioned transversely upon the table 78 for receiving sheets of various widths with the said rollers engaging opposite longitudinal edges of the sheets for properly directing the said sheets over the anvil 11 of the punch.

Mounted upon the punch body 10 beneath the overhanging extension 12 thereof is, as particularly shown in Fig. 1, a bar 93 and mounted upon this bar is a lateral guide member 94. This lateral guide member is shown in detail in Figs. 16 and 17 of the drawings and includes a body formed, at its inner extremity, with spaced flanges 95 between which are mounted a plurality of horizontally arranged rollers 96. These rollers are rigidly supported upon the body. Adjustably connecting the guide member with the bar, is a bolt or other suitable fastening device 97 which is slidably received in a suitable slot 98 extending longitudinally of the bar. The guide member 94 is, as particularly shown in Fig. 2, arranged opposite the anvil 11 and is adapted to engage the inner side edge of the sheet 67 for rigidly supporting the said sheet opposite the punch 15 so that the sheet will be firmly held at the anvil 11 to be operated upon by the punch. It will, therefore, be seen that the said sheet will be effectually supported by the rest rollers and guide members for movement over the table 77 under the influence of the sprocket chain 64 to be fed beneath the punch.

In some instances, the edge of a metal sheet is quite rough and uneven so that with such edge contacting directly with the rollers 96 of the guide member 94, the holes formed in the sheet would not be spaced equal distances from the said edge. To overcome this difficulty, I provide an edging strip shown in detail in Fig. 19 of the drawings. This edging strip is formed with a channeled body 99 adapted to fit over the inner edge of the metal sheet and provided, at one extremity, with a lateral lug 100 arranged for engagement with the forward end edge of the sheet. Mounted upon the opposite extremity of the body, is a set screw 101 adjustable to engage the upper side face of the sheet for connecting the edging strip therewith. Consequently, as the sheet is advanced over the table 77, the edging strip will move with the sheet to contact with the rollers of the guide member 94 and will present a straight edge thereto so that the holes in the sheet will be formed in alinement.

Having thus described the invention, what is claimed as new is:

1. A feeding mechanism for sheet metal punches including a drive shaft, pawl and ratchet mechanism carried by the said shaft, a detent carried by a driving element of the punch and adapted for operative engagement with said mechanism for rotating the shaft by a step by step movement, manually operable means for shifting the said pawl and ratchet mechanism for engagement with said detent, a work supporting table, and means operatively connected to said shaft and adapted for engagement with a sheet upon the table for advancing the sheet over the anvil of the punch as the said shaft is rotated.

2. A feeding mechanism for sheet metal punches including a drive shaft, coacting means carried by the said shaft and a driving element of the punch respectively for rotating the shaft by a step by step movement, manually operable means for shifting the said means upon the shaft to active position for engagement with said means upon the said element, means for locking said manually operable means in the active position of said means upon the shaft, a work supporting table, and means operatively connected to said shaft and adapted for engagement with a sheet upon the table for advancing the sheet over the anvil of the punch as the said shaft is rotated.

3. A feeding mechanism for sheet metal punches including a drive shaft, pawl and ratchet mechanism carried thereby, a detent carried by a driving element of the punch and rotatable in a path to operatively engage said mechanism for rotating the shaft by a step by step movement, manually operable means for shifting the said pawl and ratchet mechanism to active position for engagement with said detent or to inactive position out of the path of movement of the detent, means for locking said manually operable means in the active and inactive position of said pawl and ratchet mechanism, a work supporting table, and means operatively connected to said shaft and adapted for engagement with a sheet upon the table for advancing the sheet over the anvil of the punch as the said shaft is rotated.

4. A feeding mechanism for sheet metal punches including a drive shaft, a ratchet drum rotatably mounted upon the said shaft, a ratchet carried by the shaft, a pawl carried by the ratchet drum to coöperate with the ratchet, a detent carried by a driving element of the punch and adapted for engagement with said drum for rotating the shaft by a step by step movement, a work supporting table, and means operatively connected to said shaft and adapted for engagement with a sheet upon the table for advancing the sheet over the anvil of the punch as the said shaft is rotated.

5. A feeding mechanism for sheet metal punches including a drive shaft having telescopic sections, a ratchet drum rotatably mounted upon one of said sections, a ratchet carried by one of the said sections of the shaft, a pawl carried by said drum to coöperate with the ratchet, means mounted upon a driving element of the punch and rotatable in a path to engage the said drum for rotating the shaft by a step by step movement, manually operable means for telescoping the said shaft sections to shift the said drum out of the path of the said first mentioned means, a work supporting table, and means operatively connected to said shaft and adapted for engagement with a sheet upon the table for advancing the sheet over the anvil of the punch as the said shaft is rotated.

6. A feeding mechanism for sheet metal punches including a drive shaft, a ratchet drum rotatably mounted thereon, a ratchet carried by the shaft, a pawl carried by the drum and arranged to coöperate with the ratchet, means carried by a driving element of the punch and rotatable in a path to engage the drum for rocking the drum upon the shaft and rotating the said shaft by a step by step movement, means for normally holding the drum projected into the path of said first mentioned means, a work supporting table, and means operatively connected to said shaft and adapted for engagement with a sheet upon the table for advancing the sheet over the anvil of the punch as the said shaft is rotated.

7. A feeding mechanism for punches including a drive shaft, a ratchet drum rotatably mounted thereon, a ratchet carried by said shaft, a pawl carried by the ratchet drum and arranged to coöperate with the ratchet, a detent carried by a driving element of the punch and rotatable in a path to engage the drum for rocking the drum upon the said shaft to rotate the shaft by a step by step movement, a post arranged adjacent the drum, means carried by the drum and disposed to engage said post, yieldable means acting upon the drum to normally hold the drum projected into the path of said detent with the said first mentioned means adapted to engage the post for limiting the drum in its movement under the influence of said yieldable means, a work supporting table, and means operatively connected to said shaft and adapted for engagement with a sheet upon the table for advancing the sheet over the anvil of the punch as the said shaft is rotated.

8. A feeding mechanism for sheet metal punches including a drive shaft, coacting means carried by the said shaft and a driving element of the punch for rotating the shaft by a step by step movement, a drive sprocket loosely connected with said shaft, means for operatively connecting the said sprocket with the shaft to rotate therewith, a work supporting table, and means engaged with said drive sprocket and adapted for connection to a sheet upon the said table for advancing the sheet over the anvil of the punch as the said shaft is rotated.

9. A feeding mechanism for sheet metal punches including a drive shaft, coacting means carried by the shaft and a driving element of the punch respectively for rotating the shaft by a step by step movement, a sleeve freely mounted on the shaft, means carried by the shaft to engage the sleeve for connecting the sleeve with the shaft to rotate therewith, a sprocket ring carried by the sleeve, a work supporting table, and means engaged with said sprocket ring and adapted for connection to a sheet upon the said table for advancing the sheet over the anvil of the punch as the said shaft is rotated.

10. A feeding mechanism for sheet metal punches including a drive shaft, coacting means carried by the shaft and a driving element of the punch respectively for rotating the shaft by a step by step movement, a sleeve freely mounted on the shaft and formed with a clutch face, means adjustable upon the shaft and formed with a clutch face to engage the clutch face of the sleeve for connecting the sleeve with the shaft to rotate therewith, a sprocket ring mounted upon the sleeve, a work supporting table, and means engaged with said ring and adapted for connection to a sheet upon the said table for advancing the sheet over the anvil of the punch as the said shaft is rotated.

11. A feeding mechanism for sheet metal punches including a drive shaft, coacting means carried by the shaft and a driving element of the punch respectively for rotating the shaft by a step by step movement, a drive sprocket operatively connected with the shaft, a work supporting table, a sprocket chain trained over the drive sprocket and adapted for connection with a sheet upon the table for advancing the sheet over the anvil of the punch as the said shaft is rotated, and an idler sprocket mounted for vertical and lateral adjustment with respect to the drive shaft and engaging said chain for holding the chain in engagement with the drive sprocket.

12. A feeding mechanism for sheet metal punches including a drive shaft, coacting means carried by the shaft and a driving element of the punch respectively for rotating the shaft by a step by step movement, a drive sprocket operatively connected with the shaft, a work supporting table, a sprocket chain trained over said drive sprocket and adapted for connection to a sheet upon the said table for advancing the sheet over the anvil of the punch as the said shaft is rotated, a bar mounted for lateral adjustment with respect to said drive sprocket, and an idler sprocket mounted for vertical adjustment upon the said bar and engaging the sprocket chain for holding the said chain in engagement with the drive sprocket.

13. A feeding mechanism for sheet metal punches including a drive shaft, coacting means carried by the said shaft and a driving element of the punch respectively for rotating the shaft by a step by step movement, a lever for shifting the said means upon the shaft to a position for engagement with the means upon the said element, a work supporting table, and means operatively connected to said shaft and adapted for engagement with a sheet upon the table for advancing the sheet over the anvil of the punch as the said shaft is rotated.

14. A feeding mechanism for sheet metal punches including a drive shaft having telescopic sections, coacting means carried by the said shaft and a driving element of the punch respectively for rotating the shaft by a step by step movement, a shipper ring mounted upon one of said shaft sections, a lever operatively engaged with said ring and operable for telescoping the said shaft sections to shift the means upon the said shaft to inactive position with respect to the means upon the said element, a work supporting table, and means operatively connected to said shaft and adapted for engagement with a sheet upon the table for advancing the sheet over the anvil of the punch as the said shaft is rotated.

15. A feeding mechanism for sheet metal punches including a drive shaft having telescopic sections, coacting means carried by the said shaft and a driving element of the punch respectively for rotating the shaft by a step by step movement, a channeled shipper ring fixed upon one of said shaft sections, shoes loosely engaging in the channel of said ring, a lever engaging with said shoes and operable for telescoping the said shaft sections to shift the said means upon the shaft to inactive position with respect to the means upon the said element, a work supporting table, and means operatively connected to said shaft and adapted for engagement with a sheet upon the table for advancing the sheet over the anvil of the punch as the said shaft is rotated.

16. A feeding mechanism for sheet metal punches including a drive shaft, a ratchet drum rotatably mounted thereon, a ratchet carried by the shaft, a pawl carried by the drum and arranged to coöperate with the ratchet, means carried by a driving element of the punch and rotatable in a path to engage the drum for rocking the drum upon the shaft and rotating the said shaft by a step by step movement, yieldable means normally holding the drum projected into the path of said first mentioned means, means coöperating with the drum for limiting the drum in its movement under the influence of said first mentioned means, a work supporting table, and means operatively connected to said shaft and adapted for engagement with a sheet upon the table for advancing the sheet over the anvil of the punch as the said shaft is rotated.

17. A feeding mechanism for sheet metal punches including a drive shaft, coacting means carried by the said shaft and a driving element of the punch respectively for rotating the shaft by a step by step movement, a drive sprocket loosely connected with said shaft, a hand wheel adjustable upon the shaft for operatively connecting the sprocket with the shaft to rotate therewith, a work supporting table, and means engaged with said drive sprocket and adapted for connection with a sheet upon the said table for advancing the sheet over the anvil of the punch as the said shaft is rotated.

18. A feeding mechanism for sheet metal punches including a drive shaft, coacting means carried by the shaft and a driving element of the punch respectively for rotating the shaft by a step by step movement, a sleeve operatively connected with the shaft to rotate therewith, a drive sprocket carried by the said sleeve, a work supporting table, and means engaged with said drive sprocket and adapted for connection with a sheet upon the said table for advancing the sheet over the anvil of the punch as the said shaft is rotated.

19. A feeding mechanism for sheet metal punches including a drive shaft, coacting means carried by the shaft and a driving element of the punch respectively for rotating the shaft by a step by step movement, a sleeve operatively connected with the shaft to rotate therewith and provided with a flange, a sprocket ring fitting over the sleeve, means between the said flange and the said ring and connecting the ring with the sleeve, a work supporting table, and means engaged with said sprocket ring and adapted for connection with a sheet upon the said table for advancing the sheet over the anvil of the punch as the said shaft is rotated.

20. A feeding mechanism for sheet metal punches including a drive shaft, coacting means carried by the shaft and a driving element of the punch respectively for rotating the shaft by a step by step movement, a slotted bracket supporting the shaft, a drive sprocket operatively connected with the shaft, a work supporting table, a sprocket chain trained over the drive sprockets and adapted for connection with a sheet upon the table for advancing the sheet over the anvil of the punch as the said shaft is rotated, a bar, an idler sprocket mounted thereon and engaging the said sprocket chain, and means connecting the bar with the bracket and adjustable in the slot thereof for positioning the idler sprocket laterally with respect to the drive sprocket.

21. A feeding mechanism for sheet metal punches including a drive shaft, coacting means carried by the shaft and a driving element of the punch respectively for rotating the shaft by a step by step movement, a bracket supporting the shaft, a drive sprocket operatively connected with the shaft, a work supporting table, a sprocket chain trained over the drive sprocket and adapted for connection with a sheet upon the table for advancing the sheet over the anvil of the punch as the said shaft is rotated, a slotted bar, an idler sprocket carried thereby and engaging the said sprocket chain, and means connecting the bar with the bracket and engaging through the slot in the bar for positioning the idler sprocket vertically with respect to the drive sprocket.

22. A feeding mechanism for sheet metal punches including a drive shaft, coacting means carried by the shaft and a driving element of the punch respectively for rotating the shaft by a step by step movement, a drive sprocket operatively connected with the shaft, a bracket supporting the shaft, a work supporting table, a sprocket chain trained over the drive sprocket and adapted for connection with a sheet upon the table for advancing the sheet over the anvil of the punch as the said shaft is rotated, an idler sprocket engaging the said sprocket chain, and means operatively connecting the said idler sprocket with the bracket for vertical and lateral adjustment thereon with respect to the drive sprocket.

In testimony whereof I affix my signature.

JULIUS R. SCHADOW. [L. S.]

Copies of this patent may be obtained for five cents each, by addressing the "Commissioner of Patents, Washington, D. C."